(12) United States Patent
Ryu et al.

(10) Patent No.: US 12,206,126 B2
(45) Date of Patent: Jan. 21, 2025

(54) BATTERY MODULE HAVING FLAME ARRESTING STRUCTURE, BATTERY PACK, VEHICLE AND ENERGY STORAGE SYSTEM COMPRISING THE SAME

(71) Applicant: LG ENERGY SOLUTION, LTD., Seoul (KR)

(72) Inventors: Sang-Woo Ryu, Daejeon (KR); Jee-Soon Choi, Daejeon (KR); Dal-Mo Kang, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 839 days.

(21) Appl. No.: 17/413,283

(22) PCT Filed: Nov. 2, 2020

(86) PCT No.: PCT/KR2020/015156
§ 371 (c)(1),
(2) Date: Jun. 11, 2021

(87) PCT Pub. No.: WO2021/210744
PCT Pub. Date: Oct. 21, 2021

(65) Prior Publication Data
US 2022/0311088 A1 Sep. 29, 2022

(30) Foreign Application Priority Data
Apr. 17, 2020 (KR) .......................... 10-2020-0046950

(51) Int. Cl.
*H01M 50/383* (2021.01)
*H01M 50/249* (2021.01)
(Continued)

(52) U.S. Cl.
CPC ....... *H01M 50/383* (2021.01); *H01M 50/249* (2021.01); *H01M 50/262* (2021.01); *H01M 50/271* (2021.01); *H01M 50/367* (2021.01)

(58) Field of Classification Search
CPC ............. H01M 50/383; H01M 50/249; H01M 50/262; H01M 50/271; H01M 50/367; H01M 50/35
See application file for complete search history.

(56) References Cited

U.S. PATENT DOCUMENTS 10,381,622 B2   8/2019   Kim et al.
2012/0270082 A1  10/2012  Kim
(Continued)

FOREIGN PATENT DOCUMENTS

JP   2003-249243 A   9/2003
JP   2015-18706 A    1/2015
(Continued)

OTHER PUBLICATIONS

Kobayashi Katsuaki, "JP2016062757A English Translation", Apr. 25 (Year: 2016).*
(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A battery module includes a sub module including a plurality of battery cells, a lower housing to receive the sub module therein and having an opening, a first housing cover coupled to the lower housing, covering the opening of the lower housing, and having a gas inlet, a second housing cover coupled to the first housing cover from above to form a gas receiving space therebetween, and having a gas outlet, and a variable partition structure using hinges installed in the
(Continued)

gas receiving space to partition the gas receiving space to define a gas exhaust path to increase a movement path of a flame entering together with gas occurred in the sub module and entering the gas receiving space through the gas inlet.

17 Claims, 22 Drawing Sheets

(51) Int. Cl.
*H01M 50/262* (2021.01)
*H01M 50/271* (2021.01)
*H01M 50/367* (2021.01)

(56) References Cited

U.S. PATENT DOCUMENTS

| | | | |
|---|---|---|---|
| 2013/0089763 A1* | 4/2013 | Lee | H01M 50/271 429/71 |
| 2013/0252058 A1 | 9/2013 | Kim | |
| 2015/0214525 A1 | 7/2015 | Lim | |
| 2018/0254444 A1 | 9/2018 | Yoon et al. | |
| 2020/0067045 A1 | 2/2020 | Takano et al. | |
| 2020/0112007 A1 | 4/2020 | Kwag | |
| 2020/0227708 A1 | 7/2020 | Ahn et al. | |
| 2021/0265700 A1 | 8/2021 | Egashira et al. | |

FOREIGN PATENT DOCUMENTS

| | | | | |
|---|---|---|---|---|
| JP | 2015-133266 A | | 7/2015 | |
| JP | 2016062757 A | * | 4/2016 | ............. Y02E 60/10 |
| JP | 6057961 B2 | | 12/2016 | |
| KR | 10-2012-0119406 A | | 10/2012 | |
| KR | 10-2013-0107790 A | | 10/2013 | |
| KR | 10-2014-0081940 A | | 7/2014 | |
| KR | 10-2015-0090400 A | | 8/2015 | |
| KR | 10-1564439 B1 | | 10/2015 | |
| KR | 10-2016-0132143 A | | 11/2016 | |
| KR | 10-2019-0086853 A | | 7/2019 | |
| KR | 10-1998224 B1 | | 7/2019 | |
| KR | 20190086853 A | * | 7/2019 | .......... H01M 50/289 |
| KR | 10-2014462 B1 | | 8/2019 | |
| KR | 10-2061872 B1 | | 1/2020 | |
| WO | WO 2020/003800 A1 | | 1/2020 | |

OTHER PUBLICATIONS

Ahn et al., "KR 20190086853 A English Translation", Jul. 24 (Year: 2019).*

Extended European Search Report for European Application No. 20930694.3, dated Oct. 25, 2022.

* cited by examiner

BATTERY MODULE HAVING FLAME ARRESTING STRUCTURE, BATTERY PACK, VEHICLE AND ENERGY STORAGE SYSTEM COMPRISING THE SAME

TECHNICAL FIELD

The present disclosure relates to a battery module having a flame arresting structure and a battery pack comprising the battery module. More particularly, the present disclosure relates to a battery module having a structure for forcing gas out of the battery module and preventing flames from moving out of the battery module when the gas and flames occur due to a failure in battery cells received in a module housing, and a battery pack comprising the battery module. Additionally, the present disclosure relates to a vehicle and an Energy Storage System (ESS) comprising the battery pack. The present application claims the benefit of Korean Patent Application No. 10-2020-0046950 filed on Apr. 17, 2020 with the Korean Intellectual Property Office, the disclosure of which is incorporated herein by reference in its entirety.

BACKGROUND ART

A battery pack used for Energy Storage Systems (ESSs) or as an electrical energy source of vehicles is configured to properly function for the installation environment and usage condition, free of risks caused by external physical factors while in use. The battery pack for ESSs or vehicles may include at least one battery module and a Battery Management System (BMS) electrically connected to the battery module.

The battery pack for ESSs or vehicles includes a plurality of battery cells to ensure sufficient capacity and output, and the battery pack needs to be designed to ensure a user's safety when a certain battery cell fails while in use. For example, when gas leakage and flaming occurs due to the venting of the battery cell in the battery module of the battery pack, it is necessary to force the gas out of the battery module to reduce the internal pressure of the battery module, while bringing the flames to end in the battery module. To prevent the flames occurred in the battery module from moving out through a gas vent hole formed to force the gas out, the flame movement path may be formed as long as possible to prolong the time required for the flames to move from the location at which the flames occurred to the gas vent hole.

However, the number of battery cells received in the battery module and the capacity and voltage of each battery cell may vary depending on the purpose of use of the battery module, and accordingly, the total capacity and output voltage of the battery module may vary. Accordingly, when gas and flames occur due to a failure in the battery module, the gas and flames may occur in different scales depending on the purpose of use of the battery module, and it is necessary to differently design the length of the gas and flame movement paths to ensure safety.

From this perspective, there is a need for the development of a module housing and a battery module having a structure for freely adjusting the movement paths of gas and flames occurred in the battery module.

DISCLOSURE

Technical Problem

The present disclosure is designed to solve the above-described problem, and therefore the present disclosure is directed to providing a battery module having a structure for freely adjusting the movement paths of gas and flames occurring in the battery module, so that even though there are changes in applied voltage and capacity of a battery cell, it is possible to easily adjust the length of the exhaust paths of gas and flames by a simple task without needing to replace a module housing.

The object of the present disclosure is not limited to the above-described object, and these and other objects will be clearly understood by those skilled in the art from the following detailed description.

Technical Solution

To solve the above-described problem, a battery module according to an embodiment of the present disclosure includes a sub module including a plurality of battery cells, a lower housing to receive the sub module therein and having an opening, a first housing cover coupled to the lower housing, covering the opening of the lower housing, and having a gas inlet, a second housing cover coupled to the first housing cover from above to form a gas receiving space therebetween, and having a gas outlet, and a variable partition structure installed in the gas receiving space to partition the gas receiving space to define a gas exhaust path to increase a movement path of a flame entering together with gas occurred in the sub module and entering the gas receiving space through the gas inlet.

Preferably, the variable partition structure includes at least one hinge structure and at least two partition structures, the hinge structure includes a hinge axis and a hinge cap inserted and fixed to at least one end of the hinge axis, and the two partition structures are rotatably coupled around the hinge axis.

In particular, each of the two partition structures may have a first handle structure at a first end and a second handle structure at a second end, the first handle structure having a groove through which the hinge axis passes and the second handle structure having two grooves through which the hinge axis passes, the second handle structure of a first partition structure of the two partition structures and the first handle structure of a second partition structure of the two partition structures may be assembled with each other such that the grooves of the two partition structures are vertically aligned, and the two partition structures may be connected to each other by inserting the hinge axis into the grooves.

In a preferred embodiment, the first housing cover includes a cover receiving part having a recess, and a cover extended part extending outward from a top periphery of the cover receiving part.

The lower housing may include a sub module receiving part for receiving the sub module and a housing extended part extending outward from a top periphery of the sub module receiving part on a periphery of the opening, and the cover extended part of the first housing cover may be placed on the housing extended part and the second housing cover may be coupled to the cover extended part of the first housing cover.

In this instance, the housing extended part of the lower housing, the cover extended part of the first housing cover and the second housing cover may have coupling holes that are vertically aligned.

Accordingly, a nut may be coupled to a bolt passing through the coupling holes with a sealing member interposed between the first housing cover and the second housing cover.

In a preferred embodiment, the first housing cover has a plurality of insertion grooves formed on a periphery of an inner side wall of the cover receiving part to fix the first handle structure or the second handle structure of one of the two partition structures.

Preferably, the first housing cover has grooves for receiving the two partition structures in a grid shape in the cover receiving part, and grooves for receiving the hinge structure at intersections of the grid shapes.

The variable partition structure is inserted into some of the grooves and not inserted into other grooves, and flame is blocked by the variable partition structure and passes through the grooves into which the variable partition structure is not inserted.

In this instance, the variable partition structure may be provided to move the flame in a zigzag or spiral path.

Preferably, the gas inlet and the gas outlet are disposed on opposite sides along a widthwise direction of the battery module.

To solve the above-described problem, a battery pack according to an embodiment of the present disclosure includes at least one battery module according to an embodiment of the present disclosure.

To solve the above-described problem, a vehicle according to an embodiment of the present disclosure includes at least one battery pack according to an embodiment of the present disclosure.

To solve the above-described problem, an energy storage system according to an embodiment of the present disclosure includes at least one battery pack according to an embodiment of the present disclosure.

Advantageous Effects

According to an aspect of the present disclosure, it is possible to freely adjust the movement paths of gas and flames occurring in the battery module, thereby easily adjusting the length of the exhaust paths of gas and flames by a simple task without needing to replace the module housing even through there are changes in the applied voltage and capacity of the battery cell.

The present disclosure designs an exhaust passage to expel the exhaust gas on the top of the battery module when thermal runaway of the battery module occurs through the variable partition structure using hinges, and prevent the flames from being exposed to the outside. Accordingly, the present disclosure provides a battery module having a flame arresting structure. When flames occurred in a sub module enter the gas receiving space through the gas inlet together with gas, it is possible to prevent the flames from moving out through the gas outlet and let the flames fade away in the gas receiving space by increasing the movement path of the flames.

The variable partition structure using hinges used in the present disclosure can assemble a desired number of components, and uses standardized components, which makes mass production easy. Additionally, the partition structure can rotate left and right around the hinge axis, making it possible to place in a desired direction.

The variable partition structure using hinges also plays a role of a stiff structure as a bead, and an appropriate number may be selected in the trade off relationship between stiffness suppression and material cost. That is, when explosion is small, the number of partition structures needed may reduce, thereby reducing the material cost. When explosion is large, the number of partition structures may increase to increase the strength though the material cost is high.

BRIEF DESCRIPTION OF THE DRAWINGS

The accompanying drawings illustrate the preferred embodiments of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
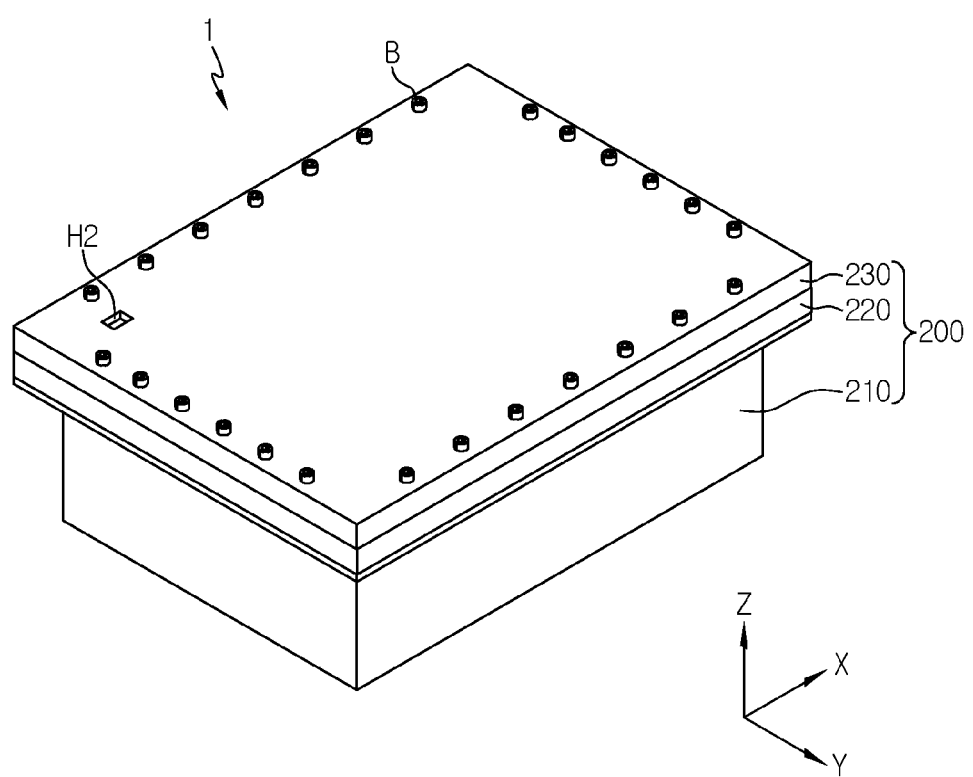
FIG. 1 is a perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
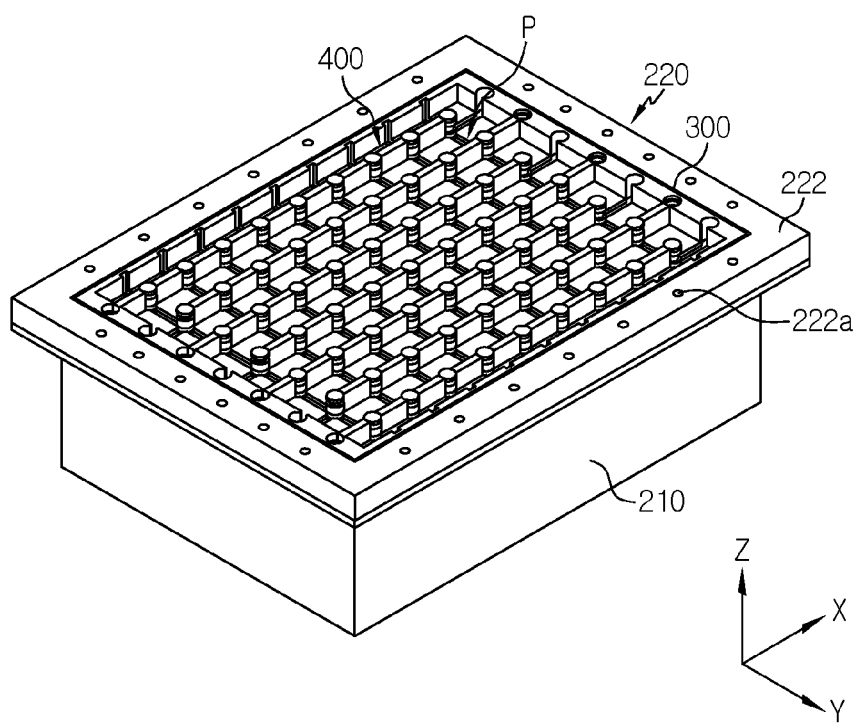
FIG. 2 is a diagram showing the battery module of FIG. 1 from which a second housing cover is removed.

First, a schematic structure of a battery module according to an embodiment of the present disclosure will be described with reference to FIGS. 1 and 2. FIG. 1 is a perspective view of the battery module 1 according to an embodiment of the present disclosure. FIG. 2 is a diagram showing the battery module 1 of FIG. 1 from which a second housing cover 230 is removed.

Referring to FIGS. 1 and 2, the battery module 1 according to an embodiment of the present disclosure includes a module housing 200. The module housing 200 includes a sub module (not shown) and a variable partition structure 400 using hinges. Additionally, the battery module 1 may further include a gasket 300 to ensure sealability.

The module housing 200 includes a lower housing 210, a first housing cover 220 and a second housing cover 230. The lower housing 210, the first housing cover 220 and the second housing cover 230 are coupled with a bolt B. The module housing 200 may receive a cell or the sub module therein. The first housing cover 220 and the second housing cover 230 are placed on top in the Z axis direction of the lower housing 210, and coupled to form a flame arresting structure. In this instance, the first housing cover 220 forms an exhaust path lower plate, and the second housing cover 230 forms an exhaust path upper plate.

The variable partition structure 400 using hinges is fixed and received on the first housing cover 220 and forms a flame exhaust path P between the first housing cover 220 and the second housing cover 230.

By the battery module 1, it is possible to capture flames between the first housing cover 220 and the second housing cover 230 when a fire occurs in the sub module. The battery module 1 may force gas out of the battery module 1 through an outlet H2 of the second housing cover 230, and arrest flames in the battery module 1 or bring flames to end.

It is possible to freely adjust the length and direction of the variable partition structure 400 using hinges. Accordingly, it is possible to conform to different battery module sizes. The variable partition structure 400 using hinges can freely adjust the movement paths of gas and flames occurring in the battery module 1. It is possible to easily adjust the length of the exhaust paths of gas and flames by a task of changing the variable partition structure 400 using hinges without needing to replace the module housing 200 even though there are changes in the applied voltage and capacity of the battery cell.

Hereinafter, the detailed structure and manufacturing method of the battery module 1 will be described in detail with reference to FIGS. 3 to 11 together with FIGS. 1 and 2.

Figure 3:
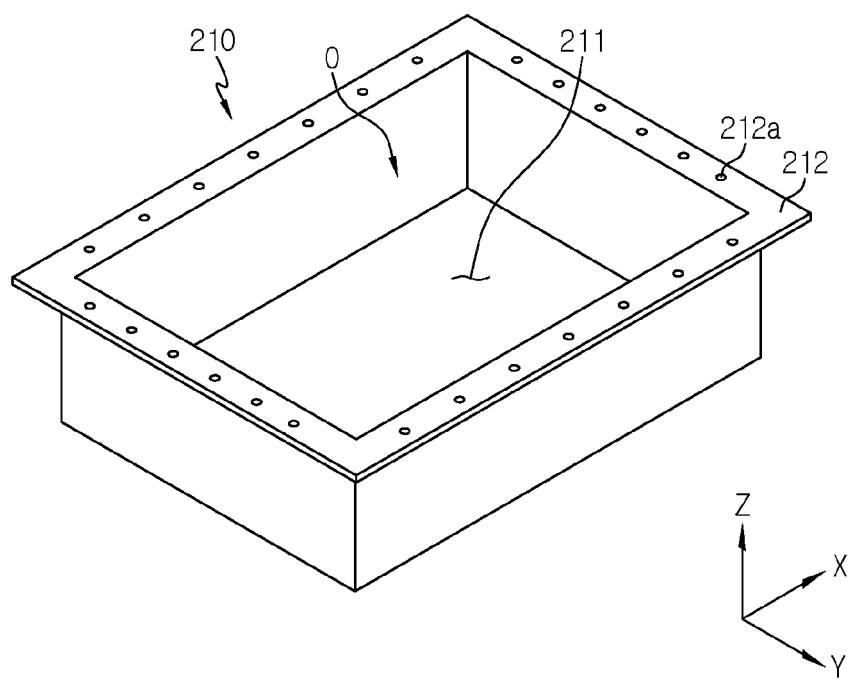
FIG. 3 is a diagram showing a lower housing included in the battery module of FIG. 1.

FIG. 3 is a diagram showing the lower housing 210 included in the battery module 1 shown in FIG. 1.

Referring to FIG. 3, the lower housing 210 corresponds to a top open bottom plate. The lower housing 210 has an opening O on top in the Z axis direction, and may receive the sub module in a receiving space formed at the center. The lower housing 210 includes a sub module receiving part 211 recessed down (Z axis direction) at the center and a housing extended part 212 extending outward from the top periphery of the sub module receiving part 211 on the periphery of the opening O. The sub module is received in the sub module receiving part 211. The housing extended part 212 has a plurality of first coupling holes 212a thereon at a predetermined interval. The first coupling hole 212a provides a space into which the bolt B is inserted to couple the lower housing 210 to the first housing cover 220 and the second housing cover 230.

Figure 4:
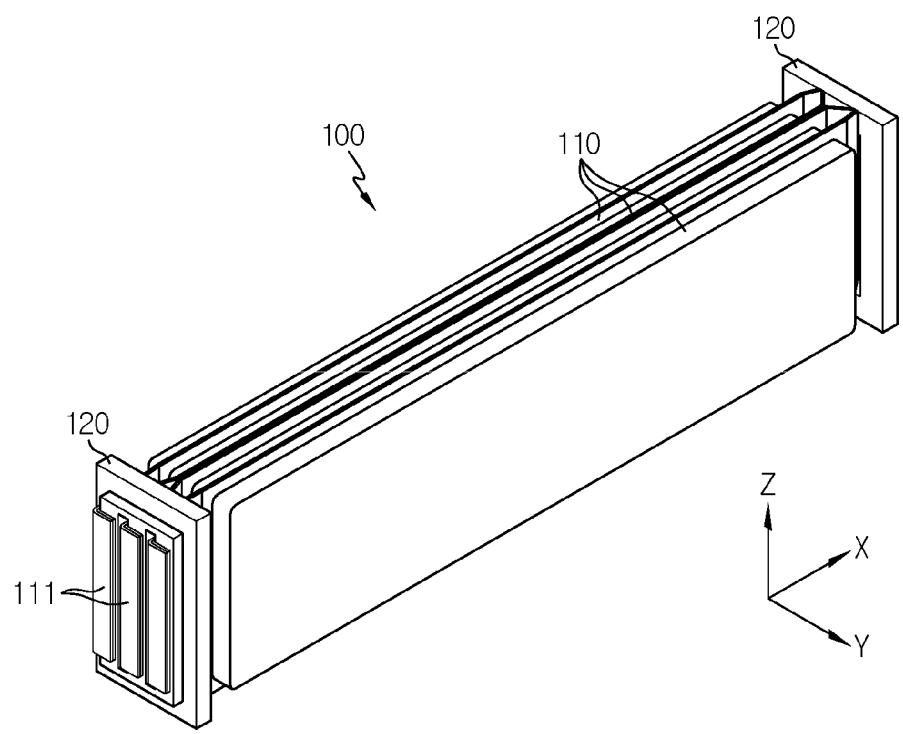
FIG. 4 is a diagram showing a sub module included in the battery module of FIG. 1.

FIG. 4 is a diagram showing the sub module 100 included in the battery module 1.

Referring to FIG. 4, the sub module 100 includes a plurality of battery cells 110 received in the internal receiving space of the lower housing 210 and stacked in contact with each other. Additionally, in addition of a cell stack formed by stacking the plurality of battery cells 110, the sub module 100 may further include a pair of busbar frames 120 each coupled to two sides in the lengthwise direction (X axis direction) of the cell stack.

The battery cell 110 may include, for example, a pouch type battery cell. The battery cell 110 has a pair of electrode leads 111. The pair of electrode leads 111 may be drawn on the two sides in the lengthwise direction (X axis direction) of the battery cell 110.

The busbar frames 120 are coupled to the cell stack and electrically connect the plurality of battery cells 110. That is, the electrode leads 111 are drawn through slits formed in the busbar frames 120 and coupled to busbars provided in the busbar frames 120. An electrical connection between adjacent battery cells 110 is established through the coupling between the electrode leads 111 and the busbars.

Figure 5:
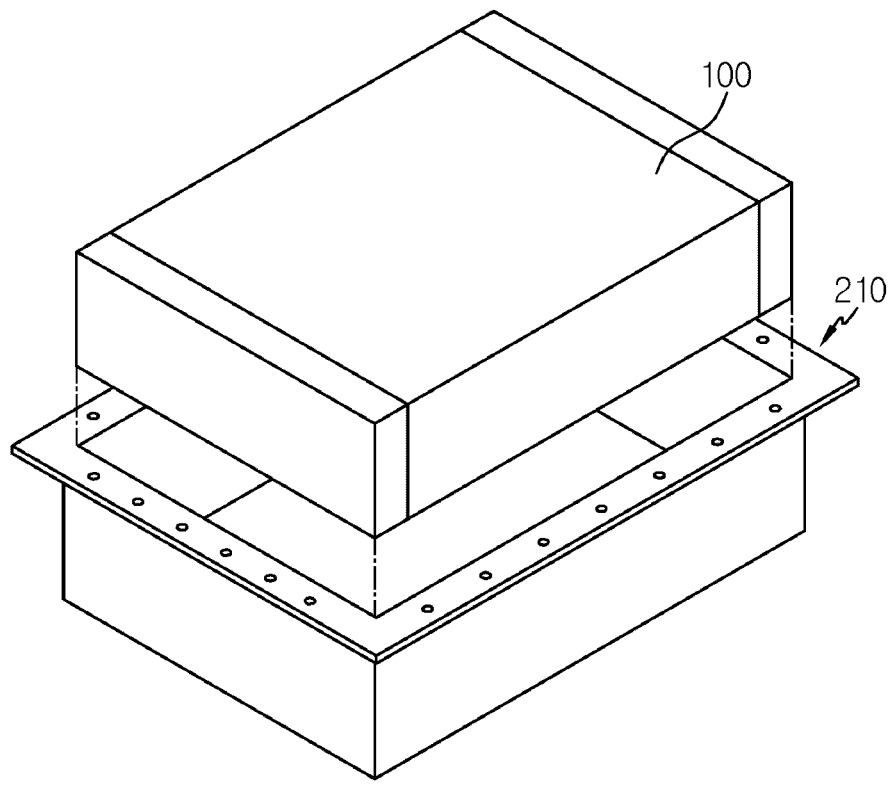
FIG. 5 is a diagram showing a process of receiving a sub module in the lower housing of FIG. 3.
Figure 5:
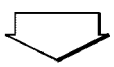
Figure 5:
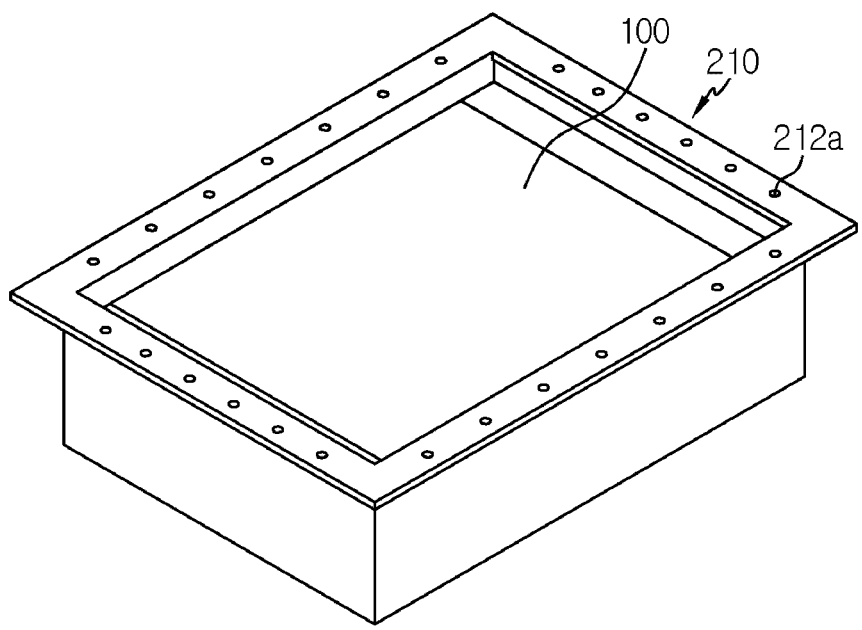

FIG. 5 is a diagram showing a process of receiving the sub module 100 in the lower housing 210 of FIG. 3.

Referring to FIG. 5, to assemble the battery module 1, first, the lower housing 210 is prepared, and the sub module 100 is inserted down (in the Z axis direction) through the opening O of the lower housing 210. The sub module 100 is seated in the sub module receiving part 211.

Figure 6:
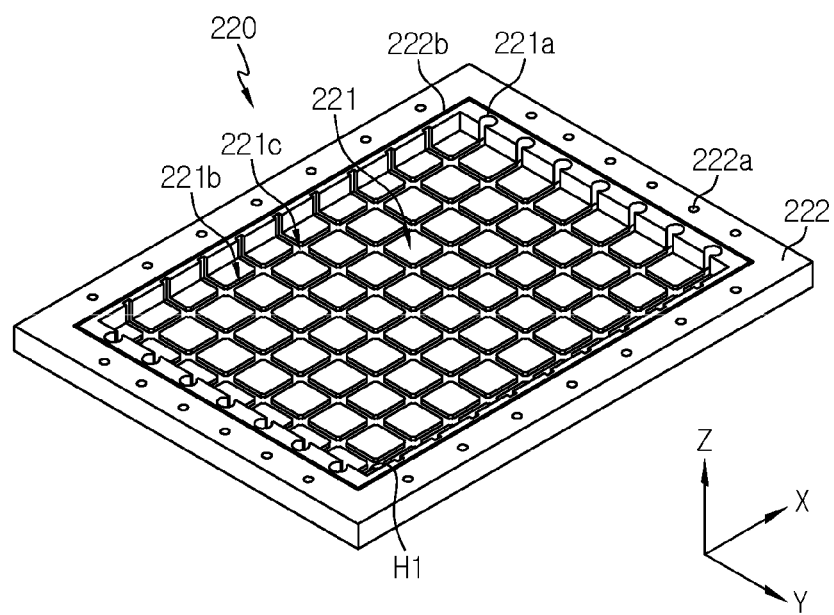
FIG. 6 is a diagram showing a first housing cover included in the battery module of FIG. 1.

FIG. 6 is a diagram showing the first housing cover 220 included in the battery module 1.

Referring to FIG. 6, the first housing cover 220 is in the shape of a plate of an approximately rectangular shape on the X-Y plane, and has a gas inlet H1 formed therethrough at one of the four corner areas. The first housing cover 220 includes a cover receiving part 221 recessed down (Z axis direction) and a cover extended part 222 extending outward from the top periphery of the cover receiving part 221. The location of the gas inlet may vary depending on the intake and exhaust direction. In this embodiment, the gas inlet H1 is provided at the corner area of the cover receiving part 221. To ensure a sufficient length of the flame exhaust path, the gas inlet H1 is preferably formed at the corner area of the cover receiving part 221, but the gas inlet may be formed at the central area of the cover receiving part 221 according to the design.

A plurality of insertion grooves 221a for inserting/fixing the variable partition structure 400 using hinges is provided on the periphery of the inner side wall of the cover receiving part 221. The cover receiving part 221 has grooves 221b, 221c into which the partition structure 400 using hinges is inserted. The plurality of insertion grooves 221a and the plurality of grooves 221b, 221c are provided, and some of them may be used to insert/fix the variable partition structure 400 using hinges. The designer may implement the variable partition structure 400 using hinges to form various flame exhaust paths by selecting some of the plurality of insertion grooves 221a and the plurality of grooves 221b, 221c.

A plurality of second coupling holes 222a formed at a predetermined interval is provided on the cover extended part 222. The second coupling hole 222a provides a space in which the bolt B is inserted to couple the first housing cover 220 to the lower housing 210 and the second housing cover 230.

The first housing cover 220 may have a sealing member groove 222b formed in the cover extended part 222, and in this case, a sealing member may be inserted into the sealing member groove 222b.

Figure 7:
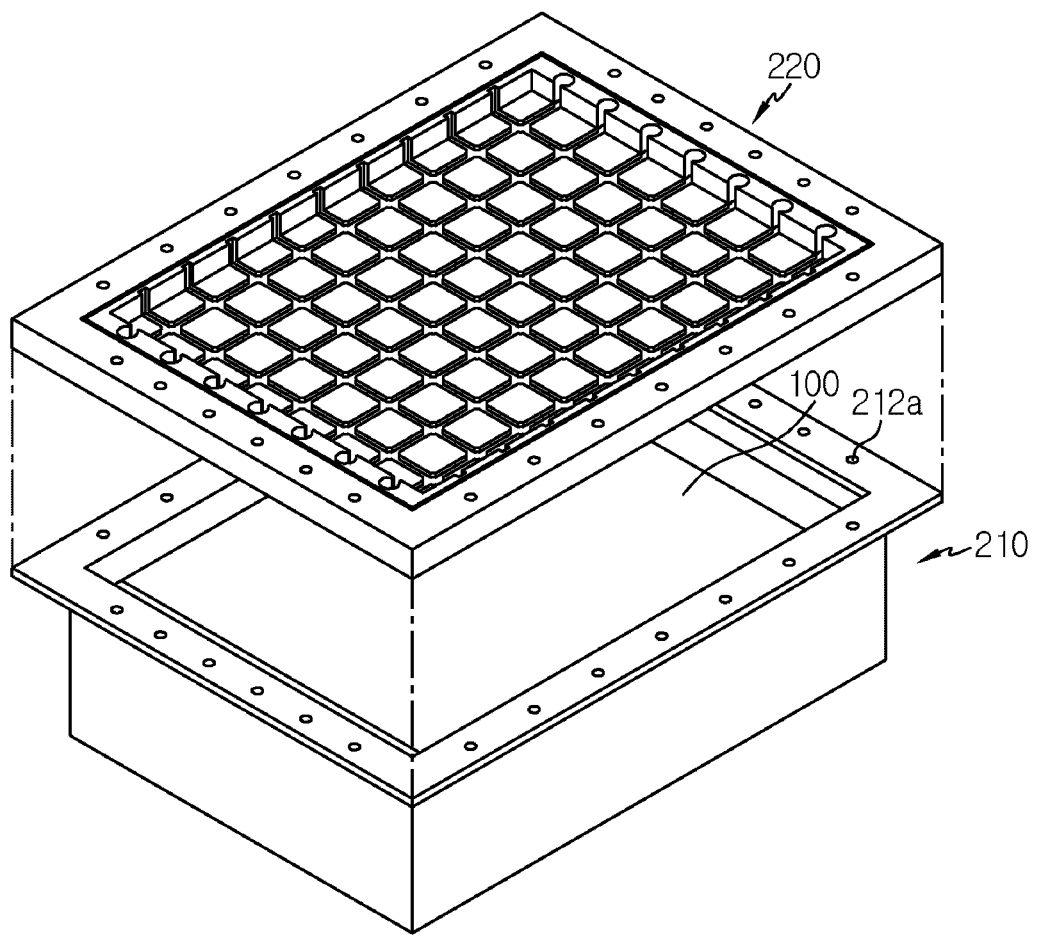
FIG. 7 is a diagram showing a process of coupling a lower housing to a first housing cover included in the battery module of FIG. 1.

FIG. 7 is a diagram showing a process of coupling the lower housing 210 to the first housing cover 220.

Referring to FIG. 7, the first housing cover 220 covers the opening O of the lower housing 210 in which the sub module 100 is received and is coupled to the top of the lower housing 210. Specifically, the coupling between the first housing cover 220 and the lower housing 210 is performed in a state of contact between the cover extended part 222 of the first housing cover 220 and the housing extended part 212 of the lower housing 210. When the first housing cover 220 is coupled to the lower housing 210, the first coupling hole 212a and the second coupling hole 222a are arranged at one-to-one matching locations so that they are vertically aligned, and the gas inlet H1 communicates with the sub module receiving part 211 of the lower housing 210. Accordingly, when gas and flames occur due to the venting of a certain battery cell 110 of the sub module 100 in the lower housing 210, the gas and flames enter the cover receiving part 221 of the first housing cover 220 through the gas inlet H1.

Figure 8:
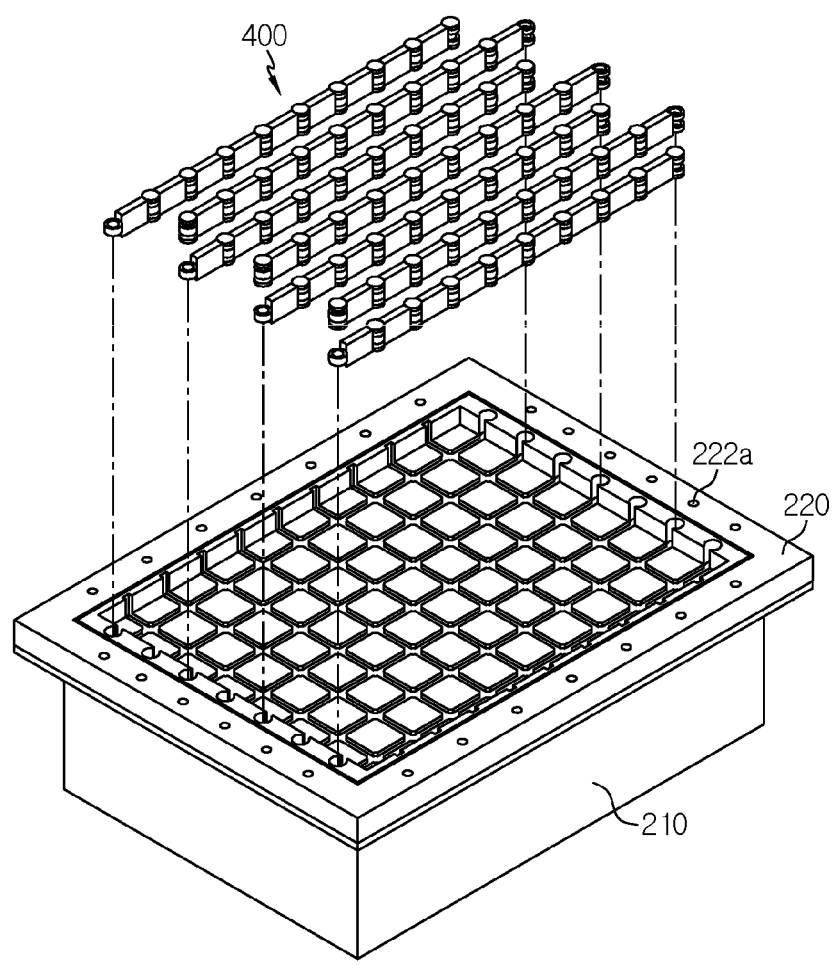
FIG. 8 is a diagram showing a process of installing a variable partition structure using hinges in a first housing cover included in the battery module of FIG. 1.

FIG. 8 is a diagram showing a process of installing the variable partition structure 400 using hinges in the first housing cover 220.

Referring to FIG. 8, the variable partition structure 400 using hinges is fixed and received on the first housing cover 220. In this instance, the insertion grooves 221a and the grooves 221b, 221c described with reference to FIG. 6 are used. The insertion grooves 221a and the grooves 221b, 221c allow the variable partition structure 400 using hinges to be received in the cover receiving part 221 of the first housing cover 220 well without movement or separation. The direction of the variable partition structure 400 using hinges and/or the number of unit structures of the variable partition structure 400 using hinges may vary depending on the exhaust path. Its detailed description will be provided below.

Figure 9:
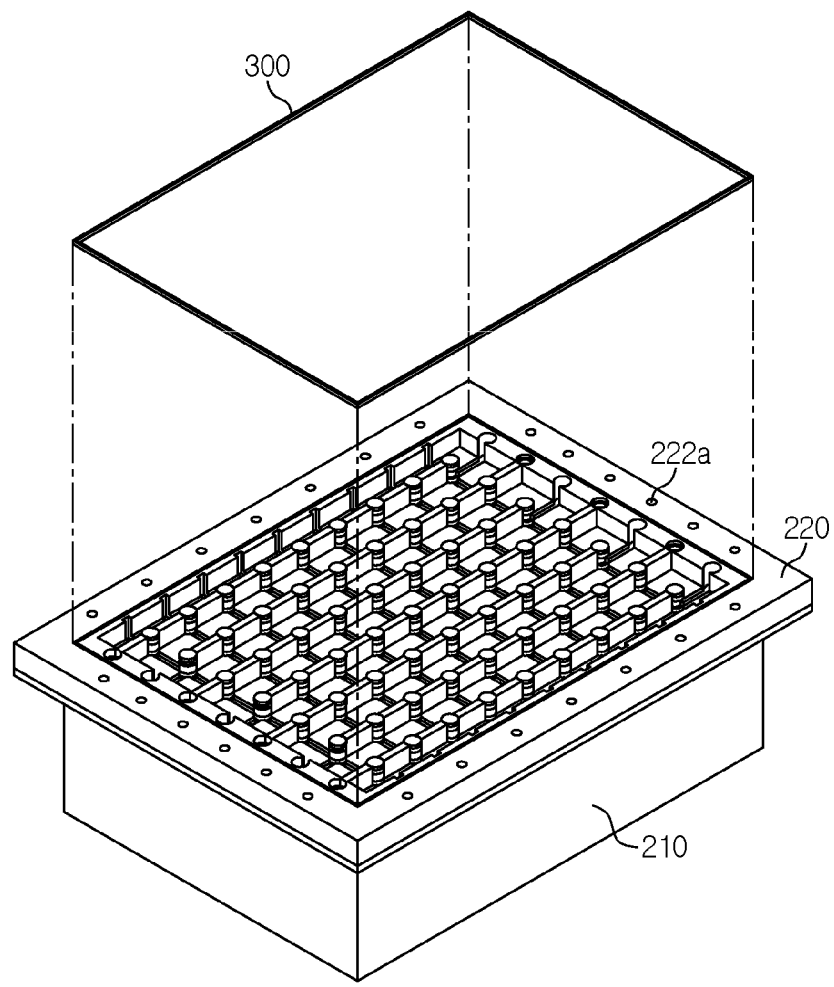
FIG. 9 is a diagram showing a process of installing a sealing member in a first housing cover included in the battery module of FIG. 1.

FIG. 9 is a diagram showing a process of installing the sealing member in the first housing cover 220.

As described with reference to FIG. 6, the first housing cover 220 may have the sealing member groove 222b formed in the cover extended part 222, and in this case, the sealing member such as the gasket 300 may be inserted into the sealing member groove 222b. When the gasket 300 as the sealing member is inserted as shown in FIG. 9, it is possible to enhance the sealability of the coupling interface between the first housing cover 220 and the second housing cover 230.

Figure 10:
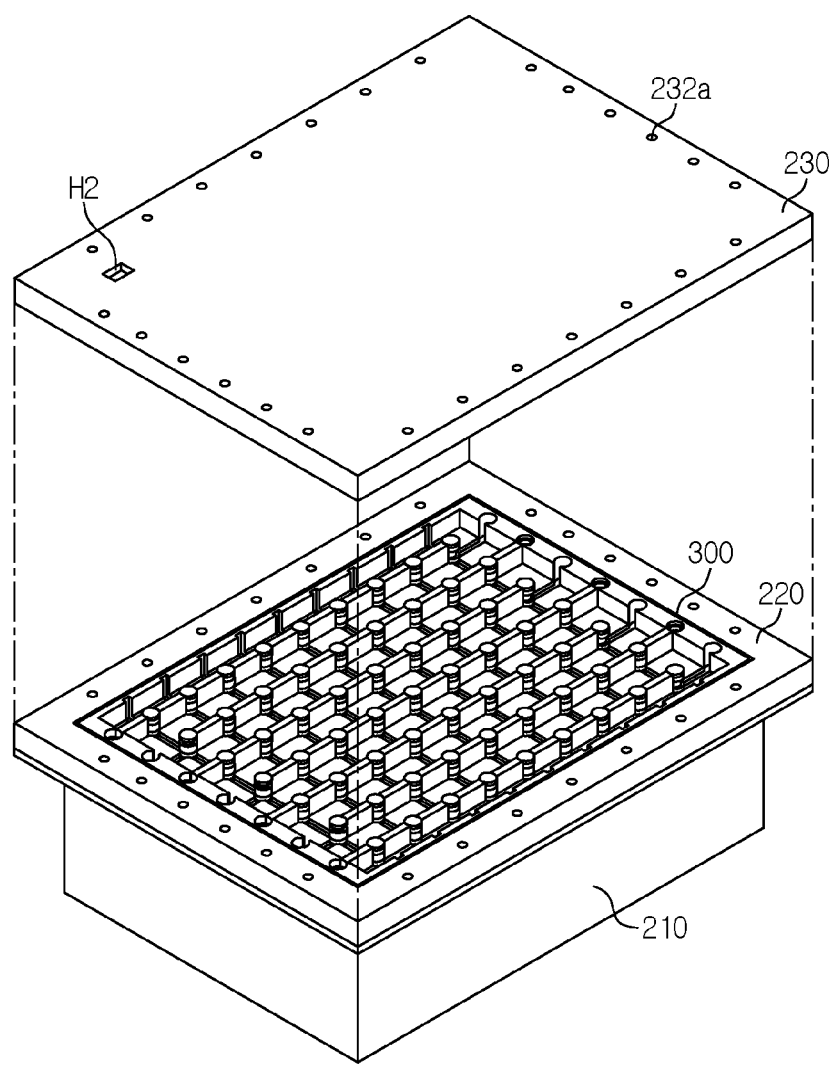
FIG. 10 is a diagram showing a process of installing a second housing cover on a first housing cover included in the battery module of FIG. 1.
Figure 11:
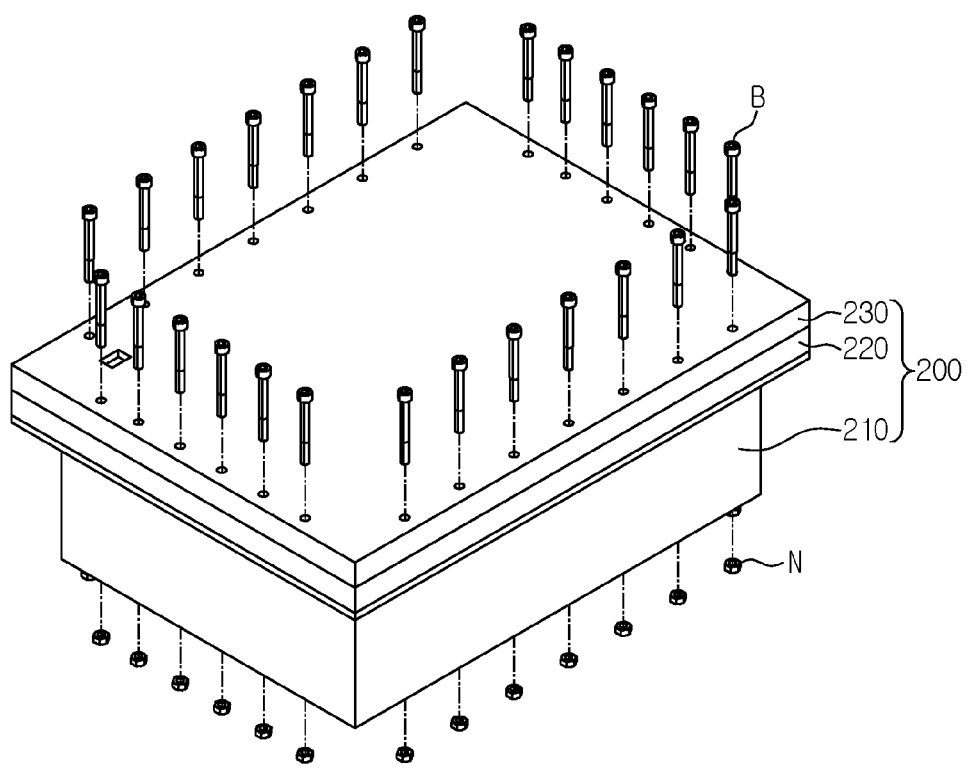
FIG. 11 is a diagram showing a process of coupling a lower housing, a first housing cover and a second housing cover included in the battery module of FIG. 1.

FIG. 10 is a diagram showing a process of installing the second housing cover 230 on the first housing cover 220, and FIG. 11 is a diagram showing a process of coupling the lower housing 210, the first housing cover 220 and the second housing cover 230.

Referring to FIG. 10, the second housing cover 230 is in the shape of a plate of an approximately rectangular shape on the X-Y plane and includes the gas outlet H2, and the second housing cover 230 is coupled to the first housing cover 220 from the top of the first housing cover 220. In the same way as the gas inlet, the location of the gas outlet may vary depending on the intake and exhaust direction, and in this embodiment, the gas outlet formed at one of the corner areas of the second housing cover 230 is taken as an example. To ensure a sufficient length of the flame exhaust path, the distance between the gas outlet H2 and the gas inlet H1 is preferably as long on the X-Y plane as possible. Since the gas inlet H1 formed at any one corner area of the cover receiving part 221 is taken as an example, the gas outlet H2 may be formed at other corner area of the second housing cover 230. The gas outlet H2 may be formed at the central area of the second housing cover 230 according to the design.

A plurality of third coupling holes 232a formed at a predetermined interval is provided in the second housing cover 230. The third coupling hole 232a provides a space in which the bolt B is inserted to couple the first housing cover 220 to the lower housing 210 and the second housing cover 230.

In this instance, the first coupling hole 212a of the housing extended part 212, the second coupling hole 222a of the cover extended part 222 and the third coupling hole 232a of the second housing cover 230 are vertically aligned. The cover extended part 222 of the first housing cover 220 is placed on the housing extended part 212 and the second housing cover 230 comes into contact with the cover extended part 222 of the first housing cover 220, and as shown in FIG. 11, the first coupling hole 212a, the second coupling hole 222a and the third coupling hole 232a placed in alignment are coupled together by inserting a nut N into the bolt B passing through them.

Meanwhile, the second housing cover 230 may have the same shape and structure as the first housing cover 220. In this instance, the first housing cover 220 and the second housing cover 230 are coupled upside down. That is, when the first housing cover 220 and the second housing cover 230 are coupled to each other, the cover receiving part 221 of the first housing cover 220 is recessed down, and the receiving part 221 of the second housing cover 230 is recessed up. Additionally, the gas outlet H2 of the second housing cover 230 is disposed opposite the gas inlet H1 of the first housing cover 220 along the widthwise direction (Y axis direction) of the battery module 1. As described above, the first housing cover 220 and the second housing cover 230 may be in 180° rotation symmetry, and accordingly, the cover receiving parts 221 may be coupled to each other with the cover extended parts 222 in contact with each other.

In any cases, when the first housing cover 220 and the second housing cover 230 are coupled, a space for receiving gas and flames entering through the gas inlet H1 from the lower housing 210 is provided between the first housing cover 220 and the second housing cover 230. The gas and flames entering the space passes through the exhaust path P formed by the variable partition structure 400 using hinges as described below, and in this process, the flame ceases to exist and the gas exits the battery module 1 through the gas outlet H2, and the internal pressure of the battery module 1 may reduce.

The variable partition structure 400 using hinges will be described in more detail with reference to FIGS. 12 to 17 in addition to FIGS. 2 and 8.

As shown in FIGS. 2 and 8, the variable partition structure 400 using hinges is installed in a gas receiving space formed between the first housing cover 220 and the second housing cover 230 and partitions the gas receiving space to define the gas exhaust path P. The variable partition structure 400 using hinges increases the movement path of flames that occur in the sub module 100 and enter the gas receiving space through the gas inlet H1 together with gas. When the variable partition structure 400 using hinges is provided to allow the flames to move in a zigzag or spiral shape to prevent the flames from directly moving out through the gas outlet H2, the flames may not be let out and may cease to exist in the gas receiving space. The variable partition structure 400 using hinges may be installed across the cover receiving part 221 along the lengthwise direction (X axis direction) and/or the widthwise direction (Y axis direction) of the first housing cover 220. In this embodiment, a plurality of variable partition structures 400 using hinges installed across the cover receiving part 221 along the lengthwise direction (X axis direction) of the first housing cover 220 is taken as an example.

The plurality of variable partition structures 400 using hinges may be installed at a predetermined interval along the widthwise direction (Y axis direction) of the first housing cover 220 and the second housing cover 230. In this embodiment, the variable partition structures 400 using hinges are shorter than the length of the cover receiving part 221, and some of them have one end of the lengthwise direction inserted into the left insertion groove 221*a* and fixed into the cover receiving part 221 and the others have the other end of the lengthwise direction inserted into the right insertion groove 221*a* and fixed into the cover receiving part 221.

The variable partition structure 400 using hinges having one end of the lengthwise direction inserted into the left insertion groove 221*a* and the variable partition structure 400 using hinges having the other end of the lengthwise direction inserted into the right insertion groove 221*a* are installed in an alternating manner at a predetermined interval along the widthwise direction (Y axis direction) of the first housing cover 220 and the second housing cover 230 and partitions the gas receiving space between the first housing cover 220 and the second housing cover 230 to allow gas to move in a zigzag manner.

Referring to FIGS. 12 to 17, the variable partition structure 400 using hinges includes at least one hinge structure 410 and at least two partition structures 420.

Figure 12:
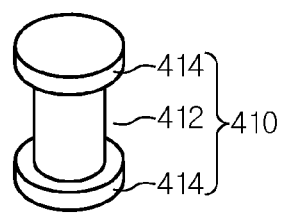
FIG. 12 is a diagram showing a hinge structure included in the battery module of FIG. 1.

As shown in FIG. 12, the hinge structure 410 includes a hinge axis 412 that may be placed in the Z axis direction and a hinge cap 414 that is inserted and fixed to two ends of the hinge axis 412. The two partition structures 420 are coupled rotatably around the hinge axis 412. It is hinge coupling. The hinge axis 412 is in the shape of a cylindrical rod so that the two partition structures 420 can rotate around the hinge axis 412.

Figure 13:
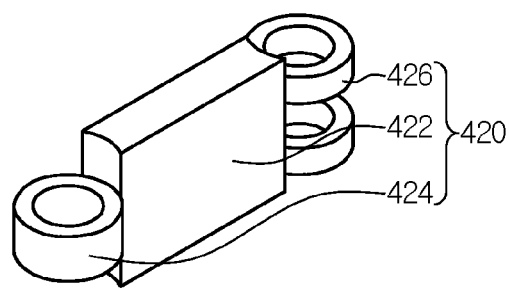
FIG. 13 is a diagram showing a partition structure included in the battery module of FIG. 1.

Referring to FIG. 13, the partition structure 420 includes a body 422 in the shape of a small plate, and a first handle structure 424 at one end of the body 422 and a second handle structure 426 at the other end. The first handle structure 424 has a groove through which the hinge axis 412 vertically passes, and the second handle structure 426 has two grooves through which the hinge axis 412 vertically passes. The groove through which the hinge axis 412 vertically passes has a circular shape having the inner diameter that is similar to the outer diameter of the cylindrical rod shaped hinge axis 412. The first handle structure 424 and the second handle structure 426 have a circular periphery defining the circular groove.

Figure 14:
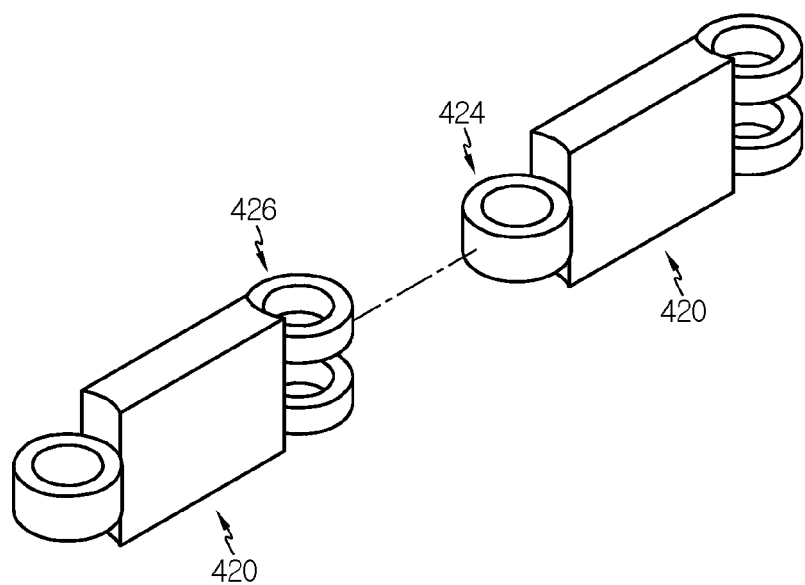
FIGS. 14 to 16 are diagrams showing a process of assembling one hinge structure and two partition structures into a unit structure.
Figure 15:
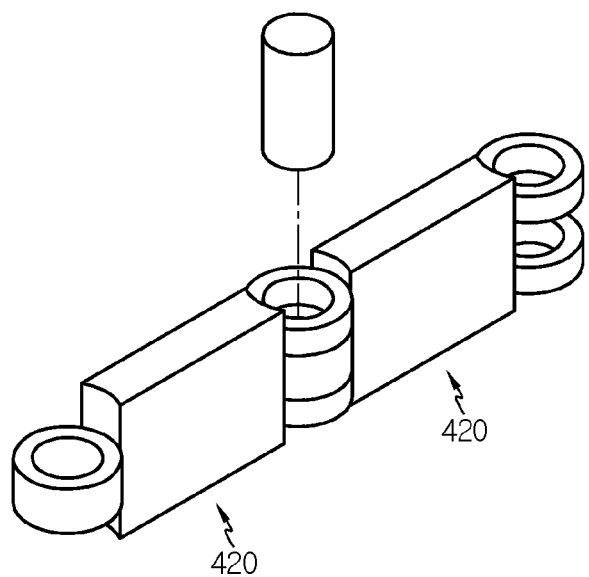
Figure 16:
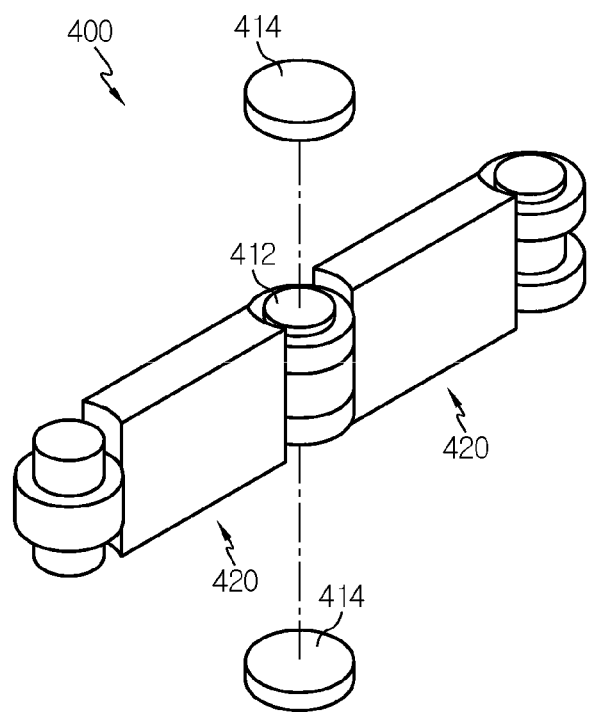

FIGS. 14 to 16 are diagrams showing a process of assembling one hinge structure and two partition structures into a unit structure.

First, as shown in FIG. 14, the second handle structure 426 of any one partition structure 420 and the first handle structure 424 of the other partition structure 420 are put together. Accordingly, the grooves through which the hinge axis 412 passes are vertically aligned. Subsequently, the partition structures 420 are assembled by inserting the hinge axis 412 into the grooves. Subsequently, when the hinge caps 414 are inserted and fixed to the two ends of the hinge axis 412, a stable unit structure is formed without the hinge axis 412 slipping out of the grooves. The two partition structures 420 can rotate around the hinge axis 412 without slipping out of the hinge axis 412 in the presence of the hinge caps 414.

Since the unit structure defining the exhaust path is formed using only three components (one hinge structure 410 and two partition structures 420), it is very easy to assemble and standardization and simplification are achieved.

Figure 17:
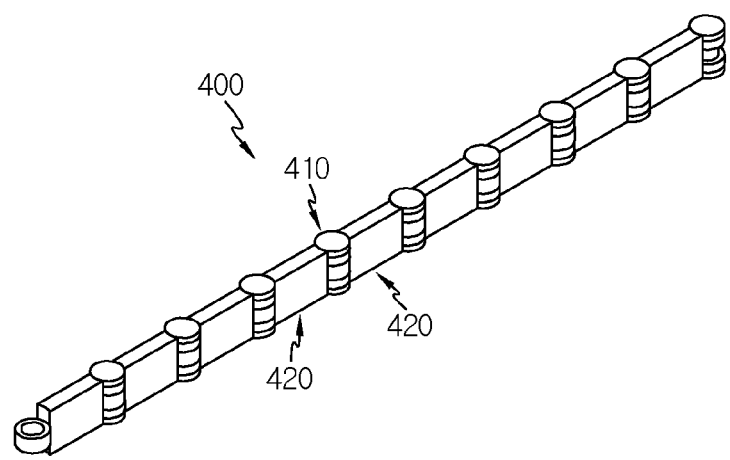
FIG. 17 is a diagram showing a variable partition structure using hinges included in the battery module of FIG. 1.

A necessary number of unit structures may be additionally connected by repeating the above-described process a desired number of times. For example, the variable partition structures 400 using hinges may be provided a little shorter than the length of the cover receiving part 221 as shown in FIG. 17.

The variable partition structure 400 using hinges used in the present disclosure may be formed by standardizing the hinge structure 410 and the partition structure 420 and assembling desired number of hinge structures 410 and partition structures 420. It is possible to adjust the length of the variable partition structures 400 using hinges by increasing and decreasing the number of hinge structures 410 and partition structures 420. Additionally, since the partition structure 420 can rotate to the left and right around the hinge axis 412, it is possible to arrange the partition structures 420 in the horizontal or vertical direction as desired. Accordingly, it is possible to freely adjust the movement paths of gas and flames occurred in the battery module, thereby easily adjusting the length of the exhaust paths of gas and flames by a simple task without needing to replace the module housing even if there are changes in the applied voltage and capacity of the battery cell. It is possible to achieve scalability depending on the type of the battery module and make mass production easy.

Figure 18:
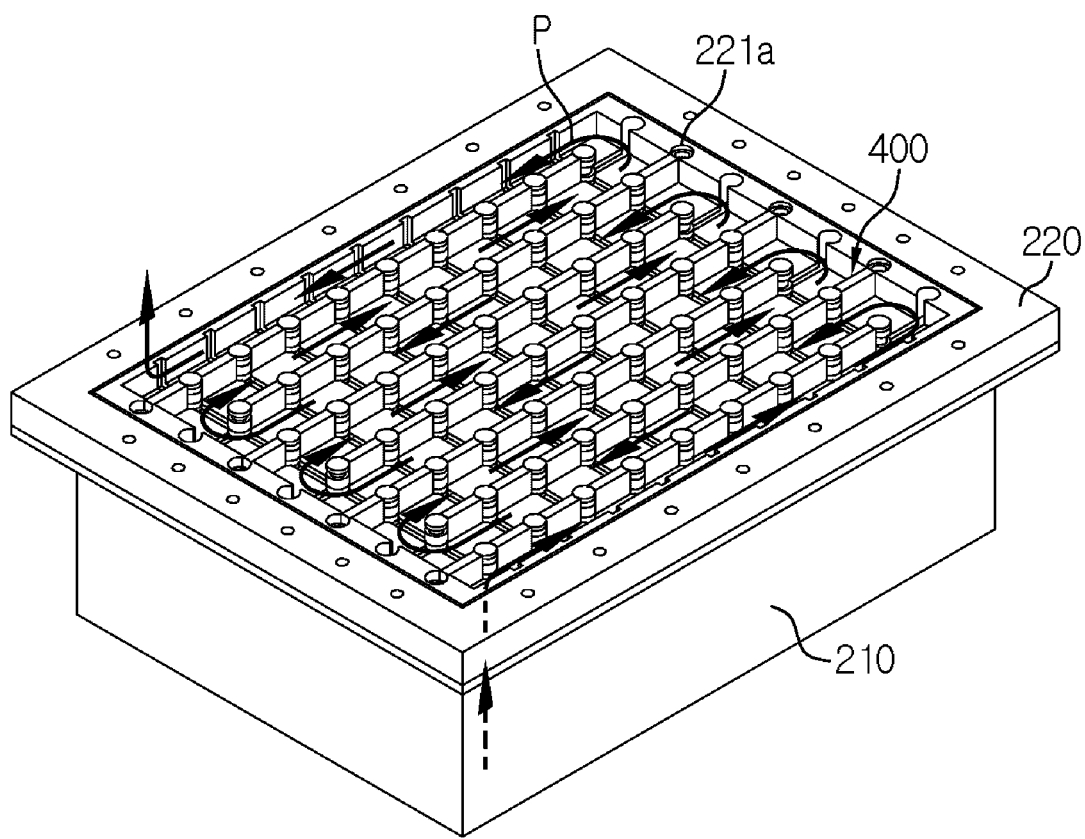
FIG. 18 is a diagram showing a gas movement path in the battery module of FIG. 1.

FIG. 18 is a diagram showing the gas movement path P in the battery module 1.

Referring to FIG. 18, the first handle structure 424 or the second handle structure 426 of the partition structure 420 is inserted or fixed to the insertion groove 221*a* formed in the first housing cover 220. The insertion groove 221*a* has a circular groove shape to conform to the shape of the periphery of the first handle structure 424 or the second handle structure 426, and the body 422 of the partition structure 420 runs from the side toward the cover receiving part 221. When the first handle structure 424 or the second handle structure 426 of the partition structure 420 is inserted into the insertion groove 221*a* in the downward direction (i.e., in the Z axis direction), the first handle structure 424 or the second handle structure 426 of the partition structure 420 cannot slip out of the side of the insertion groove 221*a* and is fixed in place.

The cover receiving part 221 of the first housing cover 220 has the grooves 221*b* in horizontal and vertical grid shapes and the grooves 221*c* at the intersections of the grid shapes. The partition structure 420 is received in the groove 221*b*, and the hinge structure 410 is received in the groove 221*c*. The groove 221*c* that receives the hinge structure 410 is a groove of a circular shape to conform to the X-Y plane projected shape of the hinge cap 414 of the hinge structure 410. The groove 221*b* that receives the partition structure 420 is a groove of a rectangular shape to conform to the X-Y plane projected shape of the body 422 of the partition structure 420. In case that the hinge cap 414 and the body 422 of the partition structure 420 have different X-Y plane projected shapes, the shape of the groove 221b that receives the partition structure 420 and the groove 221c that receives the hinge structure 410 may change accordingly.

As described above, the cover receiving part 221 has the plurality of insertion grooves 221a for inserting/fixing the variable partition structures 400 using hinges on the periphery of the inner side wall thereof. Additionally, the cover receiving part 221 has the grooves 221b, 221c into which the partition structures 420 using hinges are inserted. The plurality of insertion grooves 221a and the plurality of grooves 221b, 221c may be provided, and only some of them may be used to insert/fix the variable partition structures 400 using hinges. The designer may implement the variable partition structure 400 using hinges to form various flame exhaust paths by selecting some of the plurality of insertion grooves 221a and the plurality of grooves 221b, 221c.

The partition structures 420 are inserted into some of the grooves 221b and are not inserted into the others. The flames are blocked by the partition structures 420 and pass through the grooves into which the partition structures 420 are not inserted.

There are some of the grooves 221b into which the partition structures 420 are not inserted, and the open grooves 221b form the exhaust path P along which gas and flames move. In this embodiment, the sparsely arranged variable partition structures 400 using hinges are taken as an example, so that the flame entering together with gas that occurs in the sub module 100 and enters the gas receiving space through the gas inlet H1 of the first housing cover 220 does not directly exit through the gas outlet H2 of the second housing cover 230, and allow flames to move a long distance in a zigzag shape within the gas receiving space. The flames entering with the gas are arrested in the exhaust path P to prevent the flames from moving out. Only gas is forced out through the gas outlet H2, thereby ensuring safety.

Figure 19:
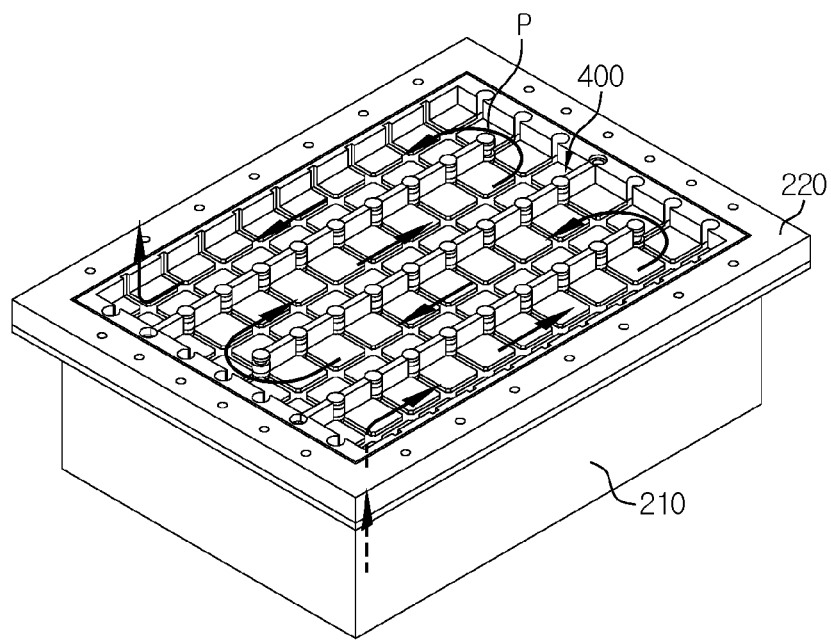
FIGS. 19 and 20 are diagrams showing a gas movement path in a battery module according to another embodiment of the present disclosure.
Figure 20:
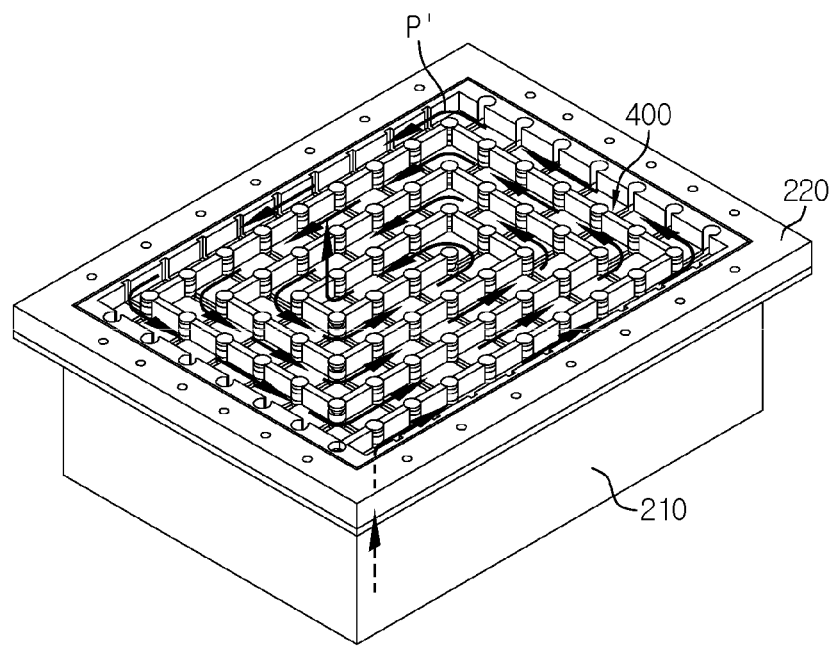

Meanwhile, referring to FIGS. 19 and 20, the battery module 1 according to an embodiment of the present disclosure may effectively prevent flames from moving out while smoothly expelling gas occurred in the sub module 100 by changing the number and array of variable partition structures 400 using hinges as necessary.

The partition structure 420 also plays a role of a stiff structure as a bead, and an appropriate number may be selected in the trade off relationship between stiffness suppression and material cost. For example, in the case of FIG. 18, due to the large explosion, a large number of variable partition structures 400 using hinges (for example, 7) is used to increase the strength though the material cost is high.

In FIG. 19, the number of variable partition structures 400 using hinges is smaller than that of FIG. 18 (for example, 3). When explosion is small, the number of variable partition structures 400 using hinges needed may reduce, thereby reducing the material cost. Accordingly, it is possible to reduce the cost by using a small number of variable partition structures 400 using hinges as shown in FIG. 19. When explosion is moderate, it is possible to achieve a proper material cost and strength by using an intermediate number of variable partition structures 400 using hinges between FIGS. 18 and 19.

Meanwhile, FIGS. 18 and 19 show that the exhaust path P directs flames toward one of the corner areas of the second housing cover, i.e., one edge, and as shown in FIG. 20, the exhaust path P' may direct flames toward the center of the second housing cover. Although the number of variable partition structures 400 using hinges is 1, the partition structure 420 changes the direction by 90° bend in the left counterclockwise direction at each corner area. In this instance, the gas outlet is provided at the center of the second housing cover 230. The variable partition structure 400 using hinges according to the present disclosure can change the direction of the partition structure 420 with respect to the hinge axis 412, so it is very useful for directing flames in a desired direction.

Figure 21:
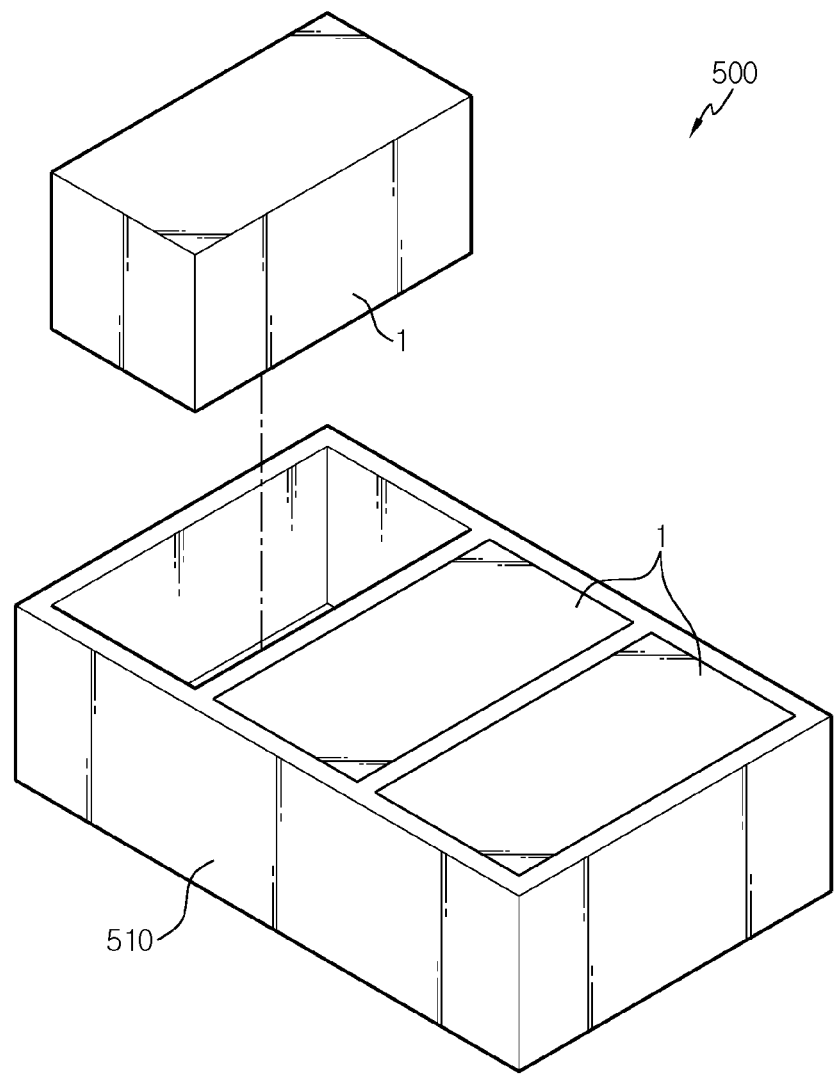
FIG. 21 is a schematic diagram showing a battery pack according to another embodiment of the present disclosure.

Meanwhile, a battery pack according to the present disclosure includes at least one battery module according to the present disclosure as described above. FIG. 21 is a schematic diagram showing the battery pack 500 according to an embodiment of the present disclosure.

Referring to FIG. 21, the battery pack 500 may include at least one battery module 1 according to the previous embodiment and a pack case 510 to package the at least one battery module 1. In addition to the battery module 1 and the pack case 510, the battery pack 500 according to an embodiment of the present disclosure may further include various types of devices for controlling the charge/discharge of the battery module 1, for example, a Battery Management System (BMS), a current sensor and a fuse. Since the battery pack 500 includes the battery module 1, the battery pack 500 may be used as a battery pack having the feature and effect of the battery module 1.

Additionally, a vehicle and/or an energy storage system (ESS) according to the present disclosure includes at least one battery pack of the present disclosure as described above.

Figure 22:
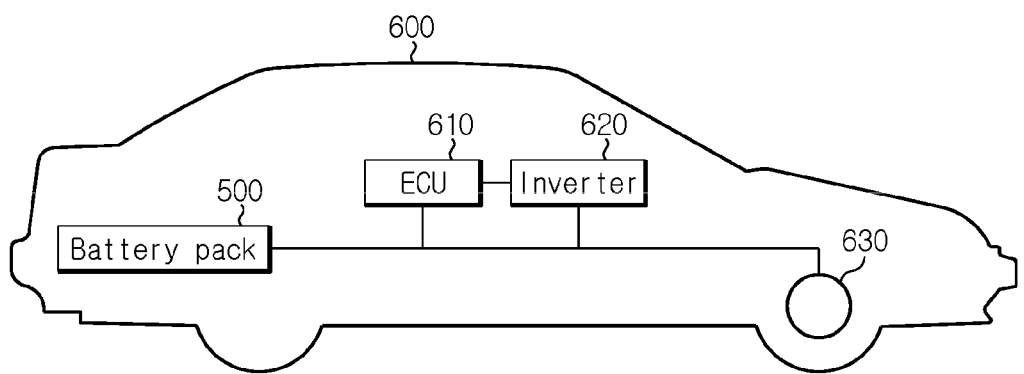
FIG. 22 is a schematic diagram showing a vehicle including a battery pack according to still another embodiment of the present disclosure.

FIG. 22 is a schematic diagram showing the vehicle 600 including the battery pack 500 according to an embodiment of the present disclosure.

Referring to FIG. 22, the vehicle 600 may include the battery pack 500 according to an embodiment of the present disclosure, an Electronic Control Unit (ECU) 610, an inverter 620 and a motor 630. Preferably, the vehicle 600 may be an electric vehicle.

The battery pack 500 may be used as an electrical energy source that supplies power to the motor 630 to drive the vehicle 600. The battery pack 500 may be charged or discharged by the inverter 620 by the operation of the motor 630 and/or an internal combustion engine (not shown). The battery pack 500 may be charged by a regenerative charging system coupled to a brake. The battery pack 500 may be electrically connected to the motor 630 of the vehicle 600 through the inverter 620.

As described above, the battery pack 500 includes the BMS. The BMS estimates the condition of the cells in the battery pack 500, and manages the battery pack 500 using the estimated condition information. For example, the BMS estimates and manages the condition information of the battery pack 500 such as State Of Charge (SOC), State Of Health (SOH), maximum allowable input/output power capacity and output voltage of the battery pack 500. Additionally, the condition information may be used to control the charge or discharge of the battery pack 500, and further, to predict when to replace the battery pack 500.

The ECU 610 is an electronic control device that controls the condition of the vehicle 600. For example, the ECU 610 determines torque information based on accelerator, brake and speed information, and controls the output of the motor 630 according to the torque information. Additionally, the ECU 610 transmits a control signal to the inverter 620 to charge or discharge the battery pack 500 based on the condition information such as the SOC and SOH of the battery pack 500 received from the BMS. The inverter 620 allows the battery pack 500 to be charged or discharged based on the control signal of the ECU 610. The motor 630 drives the vehicle 600 based on the control information (for example, torque information) received from the ECU 610 using the electrical energy of the battery pack 500.

The vehicle 600 includes the battery pack 500, and the battery pack 500 includes the battery module 1 as described above and thus may increase the flame movement path. Accordingly, even if a problem occurs in the battery pack 500 while the vehicle 600 is driving, stability is maintained. Additionally, the battery pack 500 has high stability and can be used for a long time, and thus the vehicle 600 including the same is safety and easy to manage.

As well known, renewable energy, for example, solar energy and wind power, is difficult to produce electricity at a desired time, so the ESS stores renewable energy for use when necessary. To construct a single system for storing a few hundreds of kWh or higher of power, the ESS may use the battery pack according to the present disclosure to store the power. The battery pack according to the present disclosure includes the battery module according to the present disclosure as described above and thus may increase the flame movement path. Accordingly, even though a failure occurs in a certain battery pack, it is possible to keep the ESS stable and prevent a fire from spreading.

While the present disclosure has been hereinabove described with regard to a limited number of embodiments and drawings, the present disclosure is not limited thereto and it is obvious to those skilled in the art that a variety of modifications and changes may be made thereto without departing from the technical aspect of the present disclosure and the equivalent scope of the appended claims.

What is claimed is:

1. A battery module, comprising:
a sub module including a plurality of battery cells;
a lower housing to receive the sub module therein and having an opening;
a first housing cover coupled to the lower housing, covering the opening of the lower housing, and having a gas inlet;
a second housing cover coupled to the first housing cover from above to form a gas receiving space therebetween, and having a gas outlet; and
a variable partition structure installed in the gas receiving space to partition the gas receiving space to define a gas exhaust path to increase a movement path of a flame entering together with gas occurred in the sub module and entering the gas receiving space through the gas inlet, the gas exhaust path having at least one turn spaced laterally from the gas inlet,
wherein the variable partition structure comprises two sections attached at a hinge, the two sections extending in the gas receiving space.

2. The battery module according to claim 1, wherein the variable partition structure includes at least one hinge structure and at least two partition structures,
wherein the hinge structure includes a hinge axis and a hinge cap inserted and fixed to at least one end of the hinge axis, and
wherein the two partition structures are rotatably coupled around the hinge axis.

3. A battery module, comprising:
a sub module including a plurality of battery cells;
a lower housing to receive the sub module therein and having an opening;
a first housing cover coupled to the lower housing, covering the opening of the lower housing, and having a gas inlet;
a second housing cover coupled to the first housing cover from above to form a gas receiving space therebetween, and having a gas outlet; and
a variable partition structure installed in the gas receiving space to partition the gas receiving space to define a gas exhaust path to increase a movement path of a flame entering together with gas occurred in the sub module and entering the gas receiving space through the gas inlet, the gas exhaust path having at least one turn spaced laterally from the gas inlet,
wherein the variable partition structure includes at least one hinge structure and at least two partition structures,
wherein the hinge structure includes a hinge axis and a hinge cap inserted and fixed to at least one end of the hinge axis,
wherein the two partition structures are rotatably coupled around the hinge axis,
wherein each of the two partition structures has a first handle structure at a first end and a second handle structure at a second end, the first handle structure having a groove through which the hinge axis passes and the second handle structure having two grooves through which the hinge axis passes,
wherein the second handle structure of a first partition structure of the two partition structures and the first handle structure of a second partition structure of the two partition structures are assembled with each other such that the grooves of the two partition structures are vertically aligned, and
wherein the two partition structures are connected to each other by inserting the hinge axis into the grooves.

4. The battery module according to claim 3, wherein the first housing cover includes:
a cover receiving part having a recess; and
a cover extended part extending outward from a top periphery of the cover receiving part.

5. The battery module according to claim 4, wherein the lower housing includes a sub module receiving part for receiving the sub module and a housing extended part extending outward from a top periphery of the sub module receiving part on a periphery of the opening, and
wherein the cover extended part of the first housing cover is placed on the housing extended part, and
wherein the second housing cover is coupled to the cover extended part of the first housing cover.

6. The battery module according to claim 5, wherein the housing extended part of the lower housing, the cover extended part of the first housing cover and the second housing cover have coupling holes that are vertically aligned.

7. The battery module according to claim 6, wherein a nut is coupled to a bolt passing through the coupling holes with a sealing member interposed between the first housing cover and the second housing cover.

8. The battery module according to claim 4, wherein the first housing cover has a plurality of insertion grooves formed on a periphery of an inner side wall of the cover receiving part to fix the first handle structure or the second handle structure of one of the two partition structures.

9. The battery module according to claim 4, wherein the first housing cover has grooves for receiving the two partition structures in a grid shape in the cover receiving part, and grooves for receiving the hinge structure at intersections of the grid shapes.

10. The battery module according to claim 9, wherein the variable partition structure is inserted into some of the grooves and not inserted into other grooves, and
wherein flame is blocked by the variable partition structure and passes through the grooves into which the variable partition structure is not inserted.

11. The battery module according to claim 10, wherein the variable partition structure is provided to move the flame in a zigzag or spiral path.

12. The battery module according to claim 1, wherein the gas inlet and the gas outlet are disposed on opposite sides along a widthwise direction of the battery module.

13. A battery pack comprising at least one battery module according to claim 1.

14. A vehicle comprising at least one battery pack according to claim 13.

15. An energy storage system comprising at least one battery pack according to claim 13.

16. A battery module, comprising:
a sub module including a plurality of battery cells;
a lower housing to receive the sub module therein and having an opening;
a first housing cover coupled to the lower housing, covering the opening of the lower housing, and having a gas inlet;
a second housing cover coupled to the first housing cover from above to form a gas receiving space therebetween, and having a gas outlet;
a variable partition structure installed in the gas receiving space to partition the gas receiving space to define a gas exhaust path to increase a movement path of a flame entering together with gas occurred in the sub module and entering the gas receiving space through the gas inlet, the gas exhaust path having at least one turn spaced laterally from the gas inlet; and
a plurality of insertion grooves in a top surface of the first housing cover,
wherein the variable partition structure is inserted into the plurality of insertion grooves.

17. The battery module according to claim 1, wherein the gas exhaust path comprises at least two parallel sections.

* * * * *